United States Patent [19]
Kinoshita

[11] Patent Number: 6,138,805
[45] Date of Patent: Oct. 31, 2000

[54] SPRAG TYPE ONE-WAY CLUTCH

[75] Inventor: Yoshio Kinoshita, Shizuoka-ken, Japan

[73] Assignee: NSK-Warner K.K., Tokyo, Japan

[21] Appl. No.: 09/212,297

[22] Filed: Dec. 16, 1998

[30] Foreign Application Priority Data

Dec. 22, 1997 [JP] Japan .................................. 9-353213

[51] Int. Cl.$^7$ .................................................. F16D 71/00
[52] U.S. Cl. ........................................ 192/45.1; 192/41 A
[58] Field of Search ................................ 192/41 A, 45.1, 192/41 R

[56] References Cited

U.S. PATENT DOCUMENTS

| 4,252,221 | 2/1981 | Lanzerath et al. | 192/41 A |
| 4,854,435 | 8/1989 | Kitamura et al. | 192/41 A |
| 4,979,600 | 12/1990 | Zanomi | 192/41 A |

*Primary Examiner*—Rodney H. Bonck
*Assistant Examiner*—Saúl Rodriguez
*Attorney, Agent, or Firm*—Vorys, Sater, Seymour and Pease, LLP

[57] ABSTRACT

A sprag type one-way clutch uses a spring member, namely a ribbon spring, having a cage for retaining sprags and flange portions which are made by radially bending at least a part of both axial ends of the cage.

22 Claims, 15 Drawing Sheets

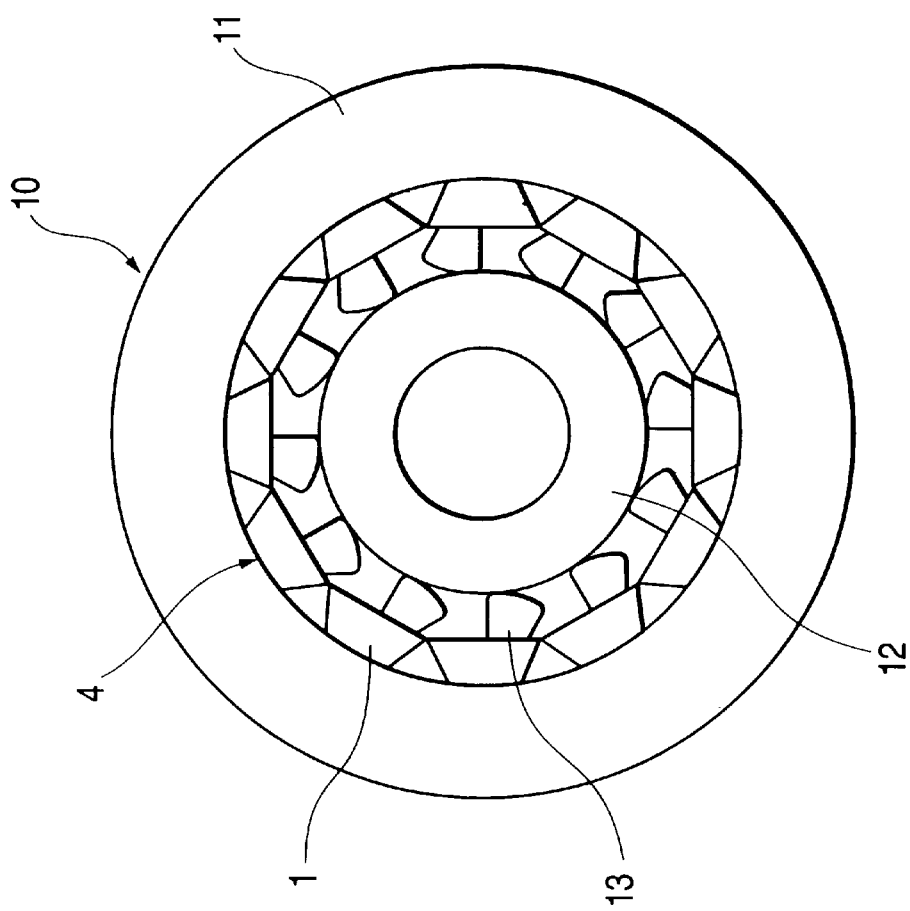
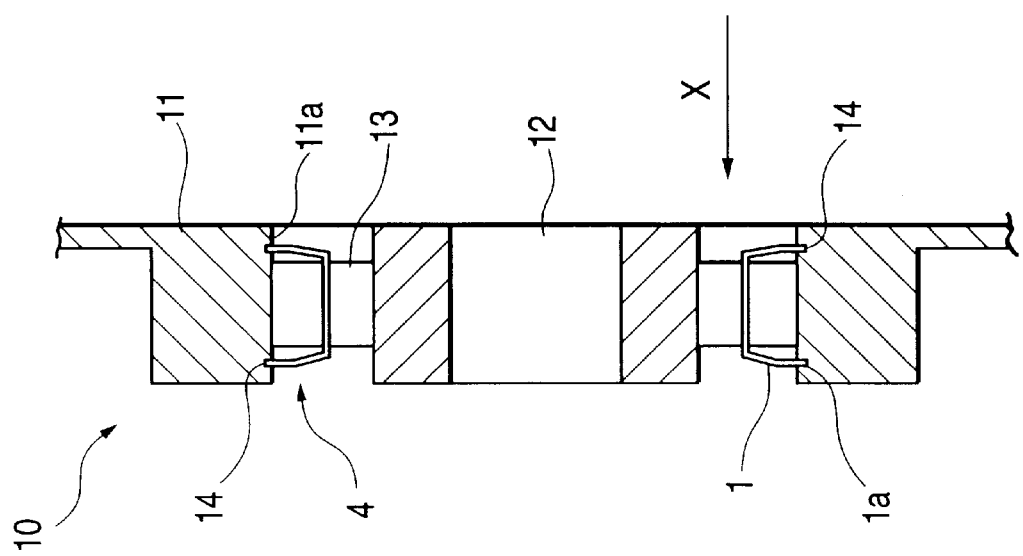

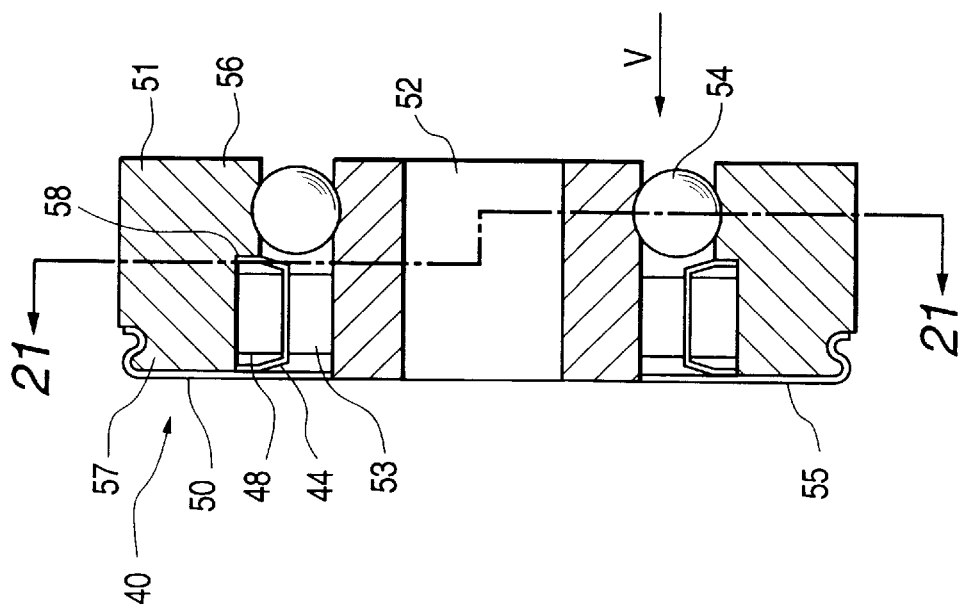
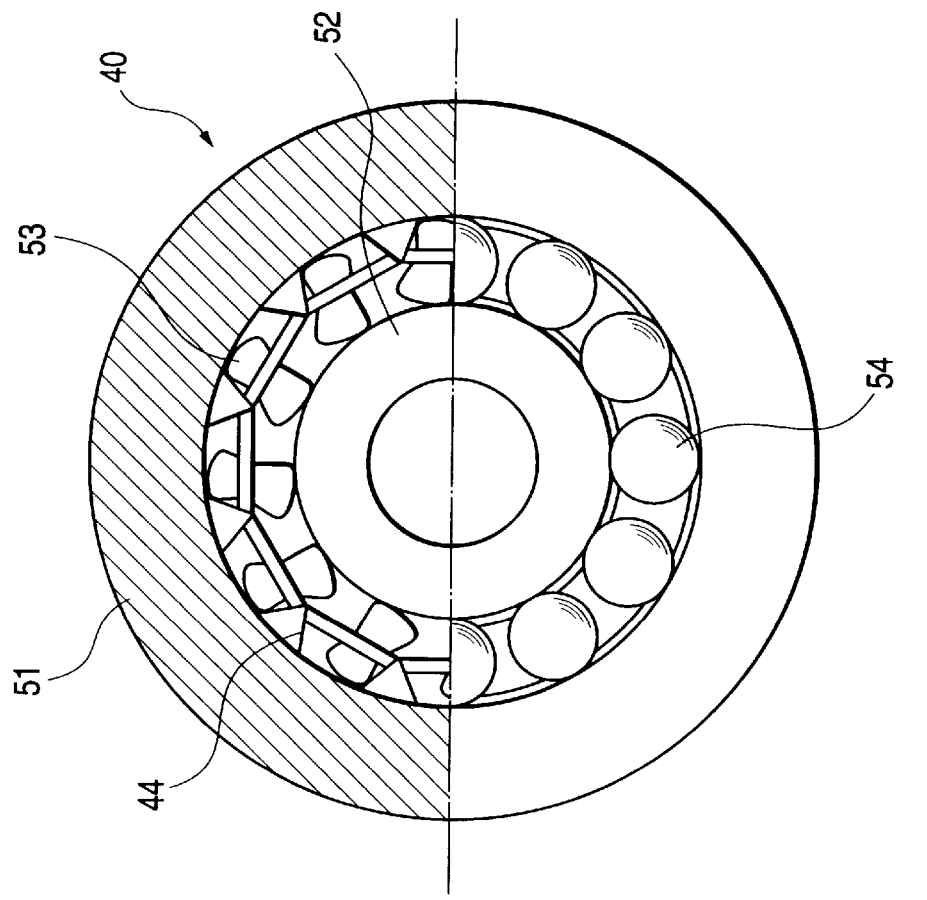

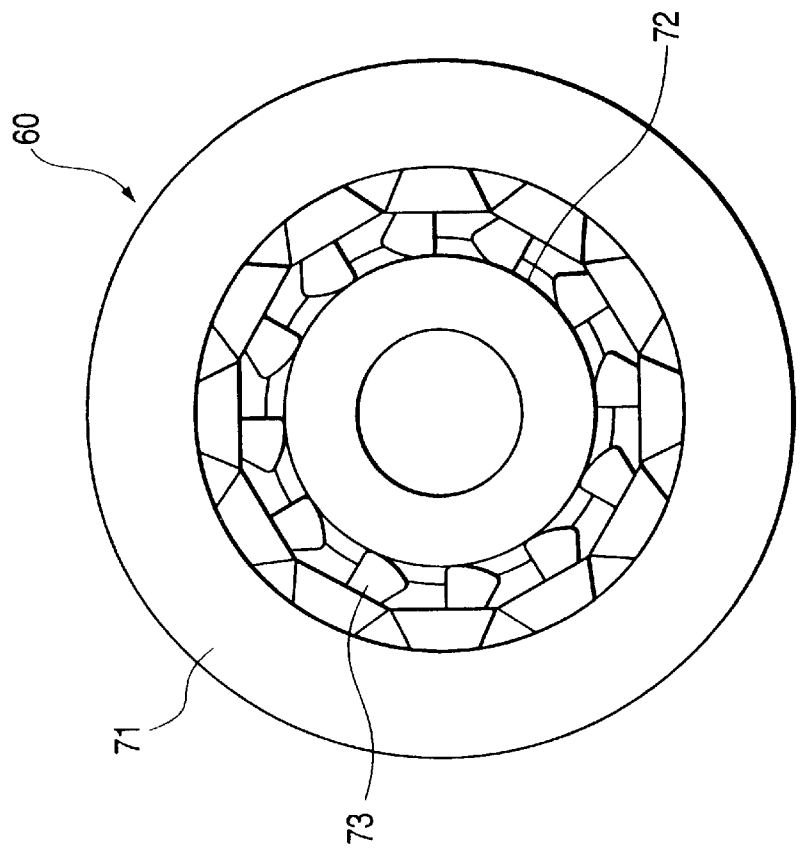
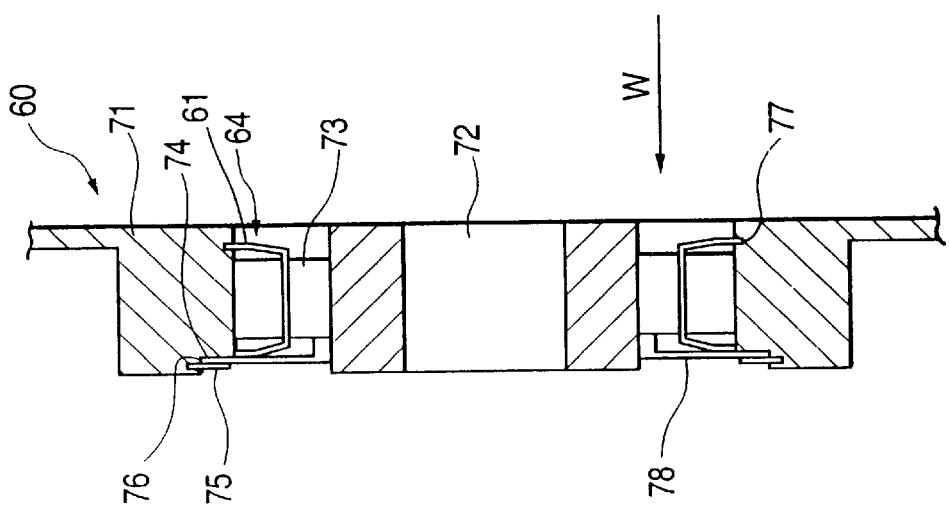

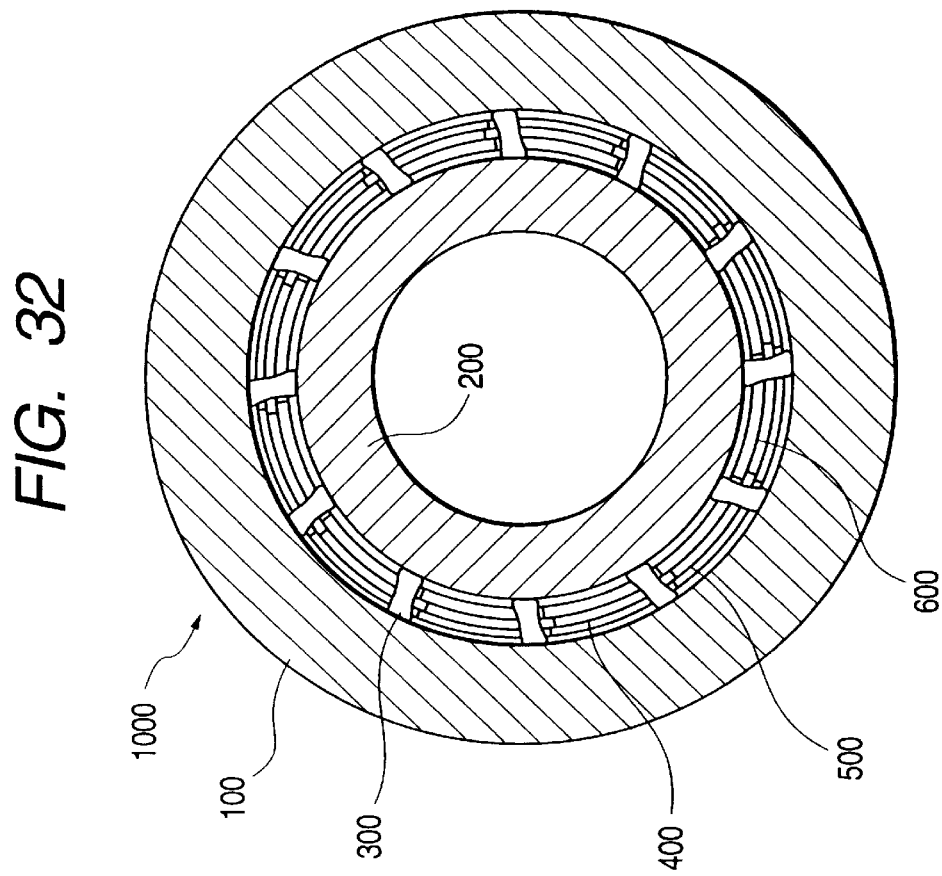
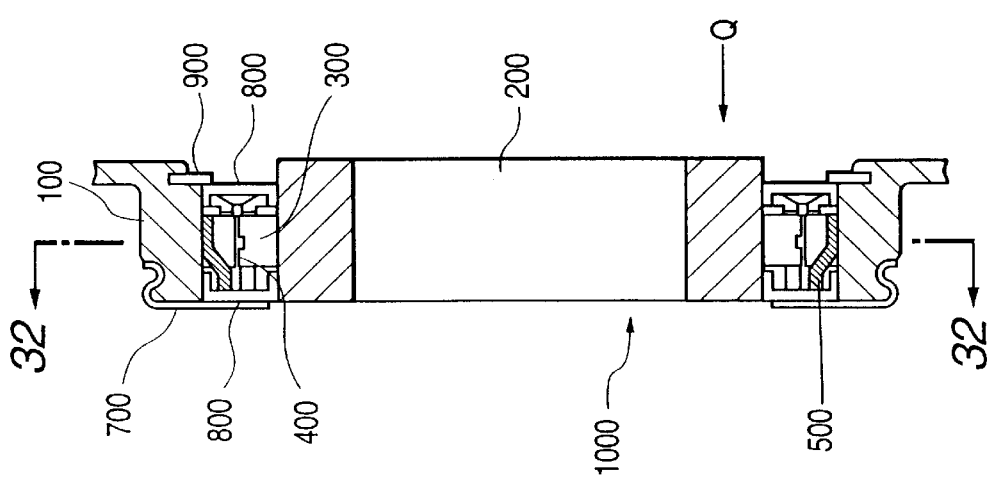

SPRAG TYPE ONE-WAY CLUTCH

BACKGROUND OF THE INVENTION

1. Field of the Invention

The present invention relates to a sprag type one-way clutch which is used in conjunction with an automatic transmission or the like for an industrial instrument such as an agricultural machinery, an automobile, a construction equipment, or the like.

2. Related Background Art

A conventional sprag type one-way clutch has, arranged between an outer race 100 and an inner race 200, as illustrated in FIGS. 31 and 32, a sprag 300 of a shape of, for example, a gourd, an annular retainer 700 made of a high rigidity material such as a steel plate or the like for retaining the sprag 300, and a ribbon spring 400 for urging the sprag 300 in an engagement (meshing) direction.

A plurality of the sprags 300 are respectively retained by windows of an outer cage 500 and an inner cage 600. On a one-way clutch 1000, an end bearing 800 is provided for concentrically maintaining at both axial ends thereof the outer race 100 and the inner race 200. One side of the end bearing 800 is retained by a snap ring 900 inserted into the outer race, and the other side by the retainer 700, so as not to be axially separable.

As it can be seen from FIG. 31, a part of the outer cage 500 protrudes toward an outer race to have an intercept (hatched portion) touching the outer race 100, causing a drag (drag torque) relative to the outer race.

FIGS. 33 and 34 illustrate details of the ribbon spring 400 used in the conventional one-way clutch described above. The ribbon spring 400 is an article manufactured from a thin steel plate by die-cutting or the like.

The ribbon spring 400 has side bars 440 extending on both longitudinal sides thereof substantially in parallel, and cross bars 410 longitudinally provided in a plurality for connecting side bars 440 on both sides. Window portions 430 each of which is surrounded by cross bars 410 and side bars 440 are longitudinally provided at equal intervals.

From a cross bar 410, a tab 450 extending toward the inside of a window portion 430 is provided. Of the ribbon spring 400, one longitudinal end of the ribbon spring 400 forms an end portion 460 (FIG. 34), and the other end forms a cross bar 410. The end portion 460 and the cross bar 410 of the other end portion are combined together to form an annular shape to be used in the one-way clutch 1000. On the side bar 440 and the tab 450, a wrinkle portion 420, convexly bent, is provided, and the wrinkle portion 420 absorbs stress and can mitigate, by a bend portion 470 provided in the vicinity of the end portion, mutual contact of the end portions of the ribbon spring when the ribbon spring is made circular and mounted on the cage.

FIG. 35 is a side view of a conventional ribbon spring 400 showing a wrinkle portion 420 and a bend portion 470.

A subassembly of a ribbon spring where sprags are incorporated is retained by two cages composing an inner cage and an outer cage.

The above-described conventional ribbon spring used for the one-way clutch has problems to be mentioned hereunder.

Firstly, the ribbon spring comprises a large number of parts. Secondly, reduction of mounting width has not been easy. Thirdly, as a wrinkle portion has to be convexly manufactured, workability has been difficulty. Fourthly, rigidity of the ribbon spring has been rather insufficient.

SUMMARY OF THE INVENTION

An object of the present invention is to make a cage unnecessary by changing the form and the material of a spring member for urging sprags, and to provide a sprag type one-way clutch which requires reduced number of parts and is reasonable in price.

Another object of the present invention is to improve rigidity of a ribbon spring, being a spring member, and to provide a sprag type one-way clutch provided with the spring member which axially supports the sprags.

In order to achieve the above-mentioned objects, the sprag type one-way clutch of the present invention comprises an outer race having an inner peripheral raceway surface and an inner race having an annular outer peripheral raceway surface arranged inside the outer race and said outer and inner races being radially spaced from each other, relatively rotatably and concentrically arranged with each other, a plurality of sprags, arranged between the outer race and the inner race, for transmitting torque between the outer peripheral raceway surface and the inner peripheral raceway surface, and a spring member which retains the sprags and urges them in a torque transmitting direction, wherein the spring member has a cage for retaining sprags and flange portions radially bent from at least a part of both axial ends of the cage.

In such arrangement, axial mounting width of the spring member is reduced, and the cage is made unnecessary as the sprags are retained by the spring member per se.

By the flange portion, drag torque is generated from the spring member.

Provision of the flange portion improves rigidity of the ribbon spring.

As will be described, when a notch is provided at a cross bar, a wrinkle (convex bend) can be eliminated.

Workability can be improved as well.

As the spring member can be disposed to have flange function, positioning is made possible.

Further, an axial backlash of the sprags can be suppressed.

BRIEF DESCRIPTION OF THE DRAWINGS

FIG. 3 is an axial cross sectional view of the one-way clutch of a first embodiment;

FIG. 4 is a front view of the one-way clutch of FIG. 3 seen from the direction of an arrow X;

FIG. 20 is an axial cross sectional view of the one-way clutch of the third embodiment;

FIG. 21 is a cross sectional view of the one-way clutch of FIG. 20 along a line 21—21 seen from the direction of an arrow V;

FIG. 26 is an axial cross sectional view of the one-way clutch of the fourth embodiment;

FIG. 27 is a front view of the one-way clutch of FIG. 26 seen from the direction of an arrow W;

FIG. 31 is an axial cross sectional view of a conventional one-way clutch;

FIG. 32 is a cross sectional view of the one-way clutch of FIG. 31 along a line 32—32 in FIG. 31 seen from the direction of an arrow Q;

DETAILED DESCRIPTION OF THE PREFERRED EMBODIMENTS

Embodiments of the present invention will now be described in detail with reference to accompanying drawings. It is important to point out that the embodiments are merely examples of the present invention, and that other variations and modifications of the present invention are possible which are not specifically illustrated. Meanwhile, in each drawing, the same portion is indicated by the same symbol.

Basic Form of a Ribbon Spring to be Used in each Embodiment

Figure 1:
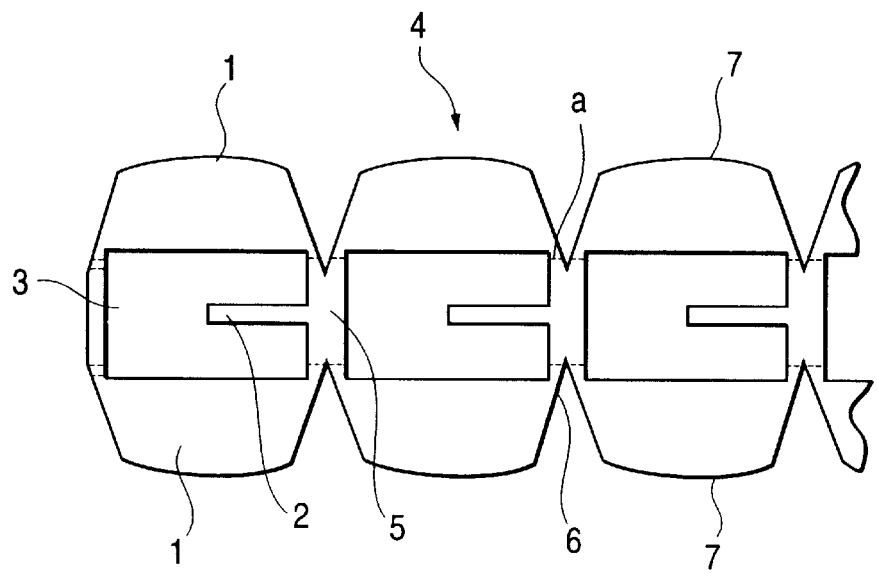
FIG. 1 is an expansion plan showing a basic form of a ribbon spring illustrated in each embodiment of the present invention.
Figure 2:
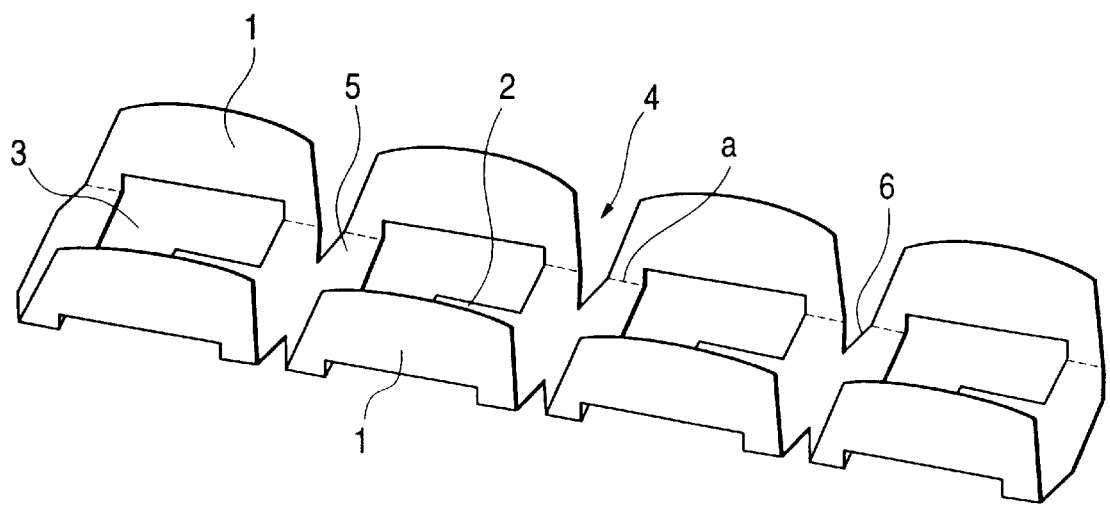
FIG. 2 is a perspective view of a ribbon spring illustrated in a state where side bars are standing.

FIGS. 1 and 2 illustrate a basic form of a ribbon spring to be illustrated in each embodiment of the present invention. FIG. 1 is a blank (expansion plan) of a ribbon spring 4, and FIG. 2 is a perspective view of the ribbon spring 4 in a state where side bars 1 are bent up.

As illustrated in FIG. 1, the ribbon spring 4 is manufactured from a thin steel plate by die-cutting or the like. The ribbon spring 4 comprises side bars 1 provided longitudinally in parallel, cross bars 5 connecting the side bars 1, window portions 3 defined by being surrounded by the side bars 1 and the cross bars 5, and tabs 2 protruding substantially longitudinally from cross bars 5 into window portions 3.

At a flange portion, or a position where a side bar 1 is connected longitudinally with a cross bar 5, a notch 6 is provided from an outer edge of a side bar 1 toward the cross bar 5. A plurality of such notches 6 are provided at equal longitudinal intervals. Accordingly, a plurality of the side bars 1 are provided longitudinally at equal intervals. Furthermore, any above-mentioned parts are integrally formed in a body. Because of such structure, the ribbon spring 4 is shorter in width dimension than a conventional ribbon spring.

In the ribbon spring 4 of such structure, the side bars 1 are bent along two parallel bend lines a arranged substantially along two longitudinal sides of the window portions 3 so as to be substantially perpendicular relative to the width of the ribbon spring blank. FIG. 2 illustrates a state after the side bars are bent. As it is clear from FIGS. 1 and 2, the bend lines a are provided in a position offset toward inside of the window portions 3 from both longitudinal sides of the window portions 3. Further, the tips of the notches 6 are positioned further inside of the bend lines a. In this arrangement, stress exerted on a column can be released.

Further, an edge portion 7 of the side bar 1 extending along the longitudinal direction is formed in an arc most protruded in the middle thereof. The form of the edge portion 7 of the side bar 1 is the same with other embodiments to be described hereafter. A reason to make the edge portion 7 of the side bar 1 in such form is, as clear from FIG. 4 illustrating a state where the ribbon spring 4 is assembled with the one-way clutch, to make the edge portion 7 to be of a form complementary to an annular inner peripheral surface of an outer race 11, in relation with abutting of the edge portion 7 of the side bar 1 on the inner peripheral surface of the outer race 11.

[First Embodiment]

FIGS. 3 and 4 illustrate a first embodiment of the present investment. FIG. 3 is an axial cross sectional view of a sprag type one-way clutch (hereinafter referred as one-way clutch) 10 with a ribbon spring 4 illustrated in FIGS. 1 and 2 incorporated therein, and FIG. 4 is a front view of the one-way clutch 10 of FIG. 3 seen from the direction of an arrow X.

In the ribbon spring 4, a side bar 1 is bent to form a flange portion, but the bent angle is not perpendicular, and is slightly obtuse. The side bars are bent, but not in a uniform angle. Instead the angle is changed in the middle to be substantially a right angle at a tip portion 1a relative to the blank of the ribbon spring 4.

Of the ribbon spring 4, the tip portions 1a of each side bar 1 are inserted into annular grooves 14 cut in an inner peripheral surface 11a of the outer race 11. Accordingly, the ribbon spring is retained by the outer race 11 as a plurality of side bars 1 longitudinally in two rows are inserted to the annular grooves 14. At this moment, the side bar 1 is subjected to snap fitting to be retained by elasticity of the ribbon spring 4 in a secured state relative to the grooves 14. In the meantime, guitar-shaped sprags 13, being torque transmitting members, are swingably retained by constricted middle parts thereof in the window portions 3 of the ribbon spring 4. The ribbon spring 4 provides an initial moment to the sprags 13 for biting with the outer race 11 and the inner race 12 to transmit torque.

According to the first embodiment, the number of parts can be reduced because a separate cage is not required to retain the sprags 13 as in conventional designs, enabling the structure of the one-way clutch to be simple.

Further, as the side bar portion is secured on the inner peripheral surface of-outer race 11, the ribbon spring 4 is prevented from axially falling off.

[Second Embodiment]

Figure 5:
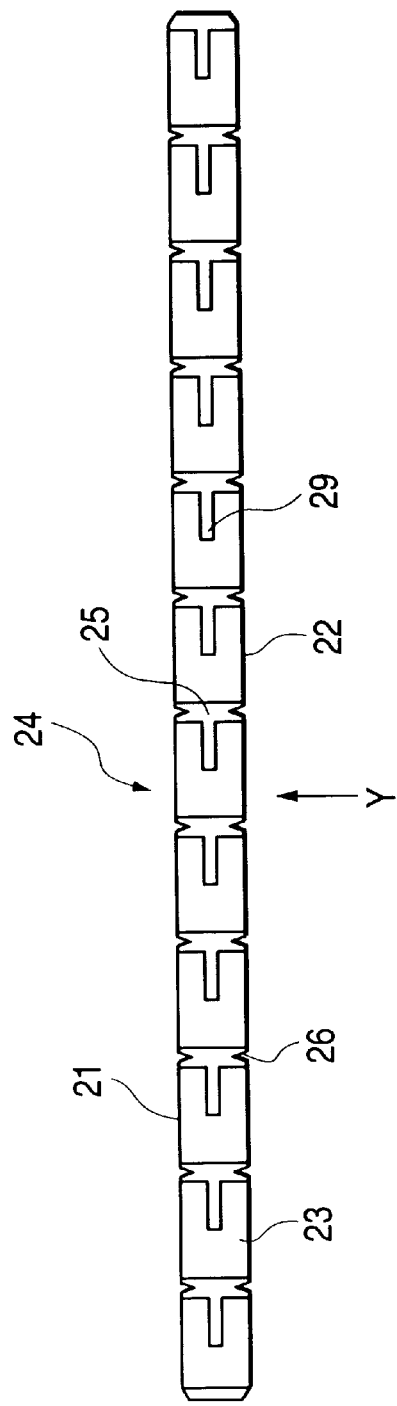
FIG. 5 is a top view of a ribbon spring of a second embodiment.

FIGS. 5 to 14 illustrate a second embodiment of the present invention. FIG. 5 is a ribbon spring 24 of the present embodiment. Basic structure thereof is the same as the ribbon spring 4 illustrated in FIGS. 1 and 2.

Figure 6:
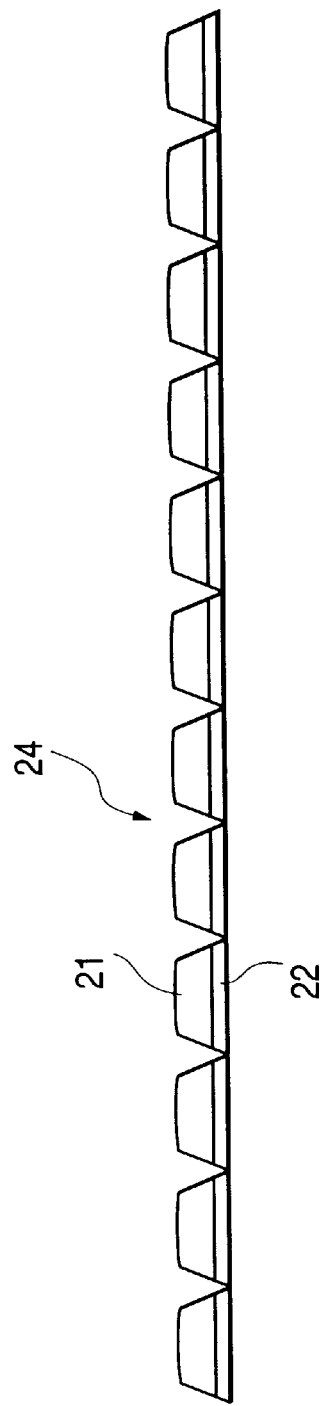
FIG. 6 is a side view of the ribbon spring of FIG. 5 seen from the direction of an arrow Y.

FIG. 5 is a top view of the ribbon spring 24, and FIG. 6 is a side view of the ribbon spring 24 of FIG. 5 seen from the direction of an arrow Y. The ribbon spring 24 comprises a plurality of side bars 21 and 22 which are bent substantially in right angle to be standing and arranged substantially in parallel in two rows, cross bars 25 connecting the side bars, apertured window portions 23 defined by being surrounded by side bars 21 and cross bars 25, and tabs 29 extending longitudinally to a predetermined distance into the window portions 23.

Figure 7:
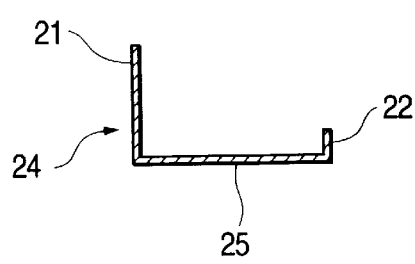
FIG. 7 is a cross sectional view of the ribbon spring of FIG. 6.

As it can be understood from FIG. 6, two rows of the side bars 21 and 22, are different in length (height) in the direction orthogonally crossing the longitudinal direction, and the side bars 21 are arranged to be higher than the side bars 22. FIG. 7 is a transverse cross sectional view of the ribbon spring 24 and illustrates relationship in length between the side bars 21 and 22. In the present embodiment, the side bars 21 and 22 are standing substantially in right angle against the cross bar 25. The notches 26 are alternately provided respectively with the side bars 21 and 22 a equal intervals.

Figure 9:
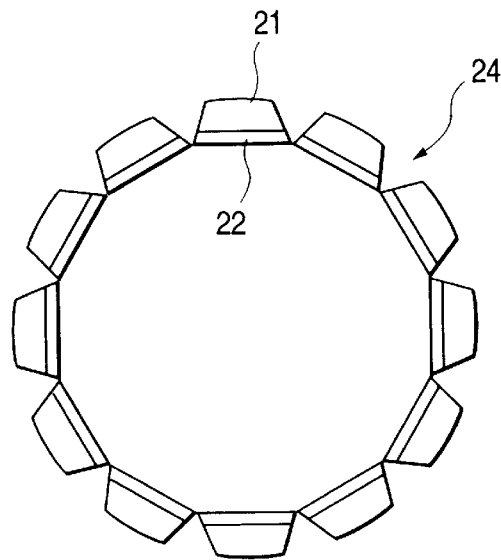
FIG. 9 is a front view of the ribbon spring of the second embodiment with side bars bent outward.
Figure 10:
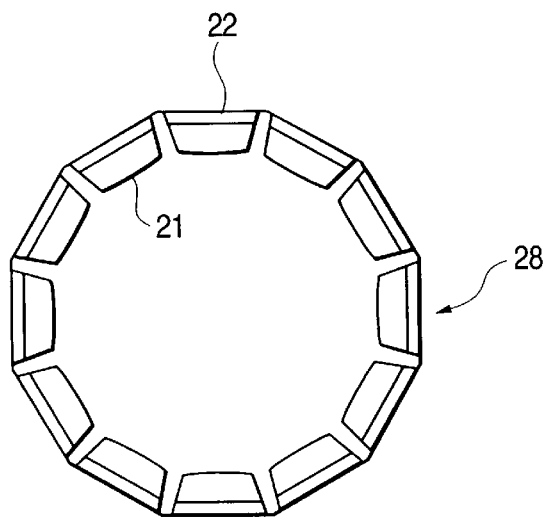
FIG. 10 is a front view of the ribbon spring of the second embodiment with side bars bent inward.

FIGS. 9 and 10 are front views of the ribbon spring 24 respectively in states to be mounted on a one-way clutch. In FIG. 9, the ribbon spring 24 is illustrated in a state where the side bars 21 and 22 are faced outward similarly to the first embodiment, while in FIG. 10, the ribbon spring 24 is illustrated in a state where the side bars 21 and 22 are bent in the reverse way to be faced inward. Accordingly, the inward faced ribbon spring 24 in FIG. 10 has side bars 21 and 22 opposing to the outer peripheral surface of the inner race.

Figure 8:
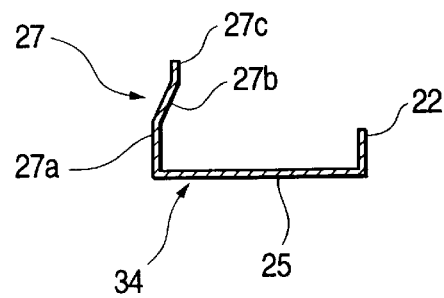
FIG. 8 is a cross sectional view illustrating a modified example of the ribbon spring of FIG. 7.

FIG. 8 is a modified example of the present embodiment, and the longer side bar 27 is standing not perpendicularly as a whole. In this modified example, the side bar 27 of one side is formed of a perpendicular portion 27a standing substantially perpendicularly from a cross bar 25, a bent portion 27b bending therefrom toward the opposing side bar 22, and a tip portion 27c rising again from the bent portion 27b to be substantially at a right angle to the cross bar 25. The ribbon spring 24 shown in FIG. 7 and a ribbon spring 34 shown in FIG. 8 are secured in different ways to be described later.

Figure 11:
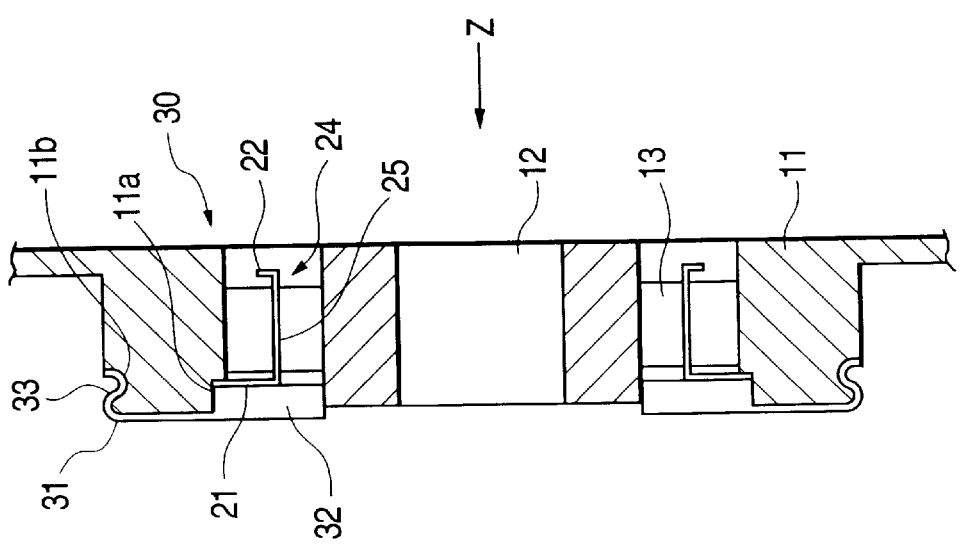
FIG. 11 is an axial cross sectional view of the one-way clutch of the second embodiment.
Figure 13:
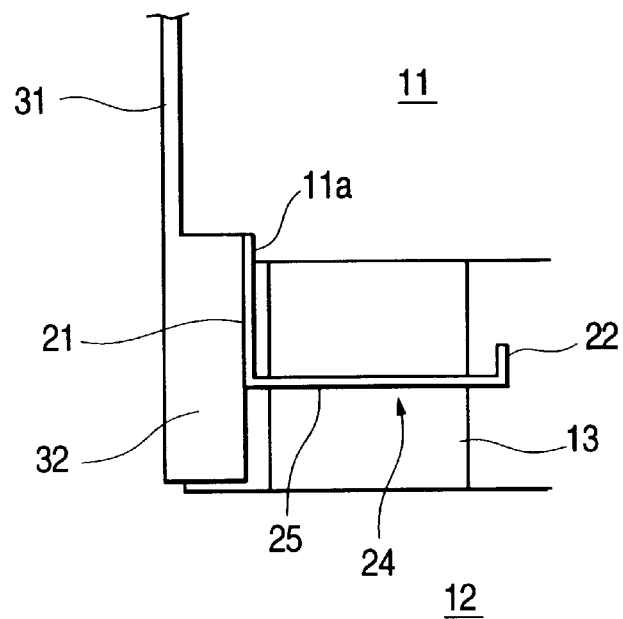
FIG. 13 is an axial partial cross sectional view of the one-way clutch with the ribbon spring of FIG. 7 incorporated therein.

FIGS. 11 to 14 are views showing a one-way clutch using the ribbon spring of the second embodiment. FIG. 11 is an axial cross sectional view of a one-way clutch 30 with the ribbon spring 24 mounted thereon.

In FIG. 11, the ribbon spring 24 in the form as illustrated in FIG. 7 is mounted. The basic structure thereof is the same as the first embodiment as illustrated in FIG. 3. The second embodiment is different in a point that a retainer 31 is mounted on the outer race 11. Of a pair of the side bars 21 and 22 of the ribbon spring 24, the longer side bar 21 abuts on an end surface 11a of an annular step portion of the outer race 11.

The annular retainer 31 has a radial end portion 33 which is inserted into an annular groove 11b of the outer race 11 to make the retainer secured and retained by the outer race 11. The other end of the retainer 31 forms an annular bearing portion 32 and slides to touch the side bar 21 of the ribbon spring 24 to become a bearing, and retains the ribbon spring 24 in a secured state to the outer race.

In a state where the tip portion of the side bar 21 of the ribbon spring 24 is abutting on the end surface 11a of the outer race 11, the bearing portion 32 of the retainer 31 retains the side bar 21 to an end surface 11a. Accordingly, abutting of the end surface 11a on the tip portion of the side bar 21 generates drag torque relative to the outer race 11.

Figure 12:
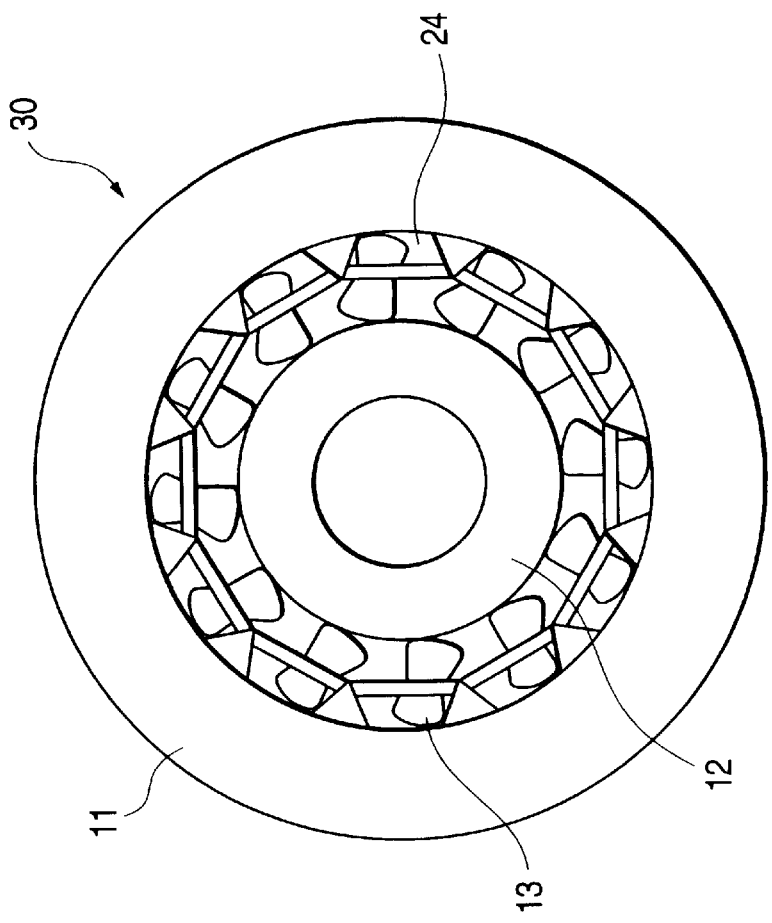
FIG. 12 is a front view of the one-way clutch of FIG. 11 seen from the direction of an arrow Z.
Figure 14:
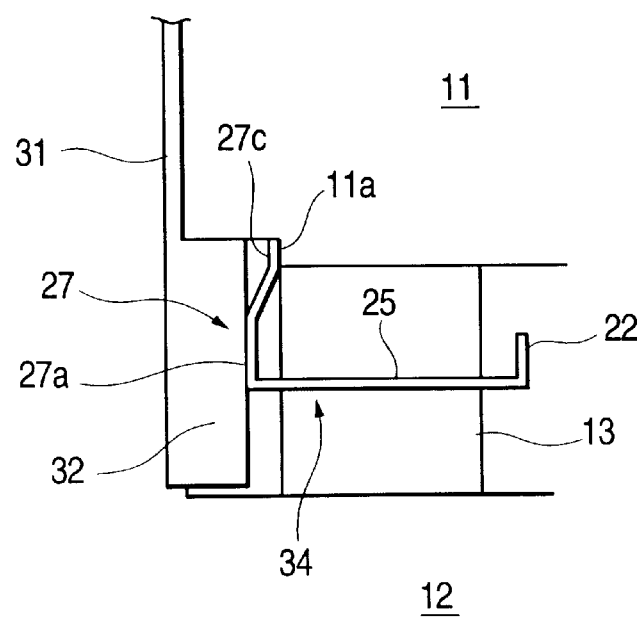
FIG. 14 is an axial partial cross sectional view of the one-way clutch with the ribbon spring of FIG. 8 incorporated therein.

FIG. 12 is a front view of the one-way clutch 30 of the FIG. 11 seen from the direction of an arrow Z, illustrating the ribbon spring 24 mounted in a state facing outward. FIG. 14 is a partial cross sectional view of the one-way clutch 30 with the ribbon spring 34 illustrated in FIG. 8 mounted thereon. The ribbon spring 34 abuts on the end surface 11a of the outer race 11 at the tip portion 27c, and the bearing portion 32 of the retainer 31 at the perpendicular portion 27a. In this case, the drag torque relative to the outer race 11 is also obtained by touching of the end surface 11a with the tip portion 27c. Furthermore, as the bent portion 27b is also provided, setting of required drag torque is easy.

In addition, in the above-described embodiment, although the retainer 31 is composed of an end portion 33 secured to the outer race 11 and the bearing portion 32 integrated in a body, other structures are also possible in which the bearing portion 32 is separated therefrom to be an annular bearing which is retained by the retainer 31 from the outside in the axial direction.

The side bar may be bent inward, the retainer 31 may be secured to the inner race 12, and a step may be provided on the outer peripheral surface of the inner race 12 for also having the ribbon spring 24 secured. In this case, drag torque is generated between the ribbon spring 24 and the inner race 12.

The side bars are bent so as to be spreading in a direction opposite to the direction of the sprags, but the bending is not required for all side bars, and it goes without saying that the bending may be set at arbitrary positions.

In the case of the second embodiment, as the ribbon spring 24 also retains the sprags 13, the cage which is conventionally required becomes unnecessary.

[Third Embodiment]

Figure 15:
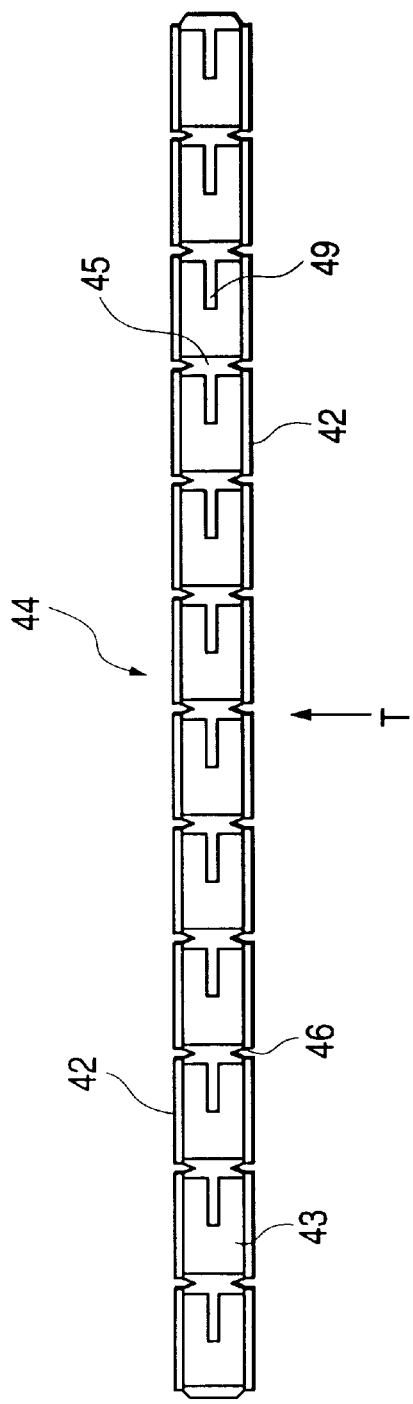
FIG. 15 is a top view of a ribbon spring of a third embodiment.

FIGS. 15 to 21 illustrate a third embodiment of the present invention. FIG. 15 illustrates a ribbon spring 44 according to the present embodiment. The basic structure thereof is the same as the ribbon spring 4 illustrated in FIGS. 1 and 2.

Figure 16:
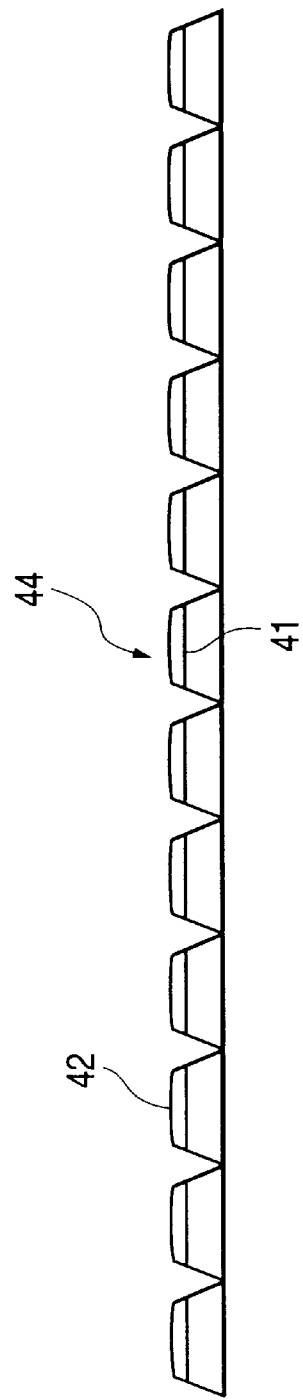
FIG. 16 is a side view of the ribbon spring of FIG. 15 seen from the direction of an arrow T.

FIG. 15 is a top view of a ribbon spring 44, and FIG. 16 is a side view of the ribbon spring of FIG. 15 seen from the direction of an arrow T. The ribbon spring 44 comprises a plurality of side bars 42 respectively bent substantially in right angle to be standing and arranged substantially in parallel in two rows, cross bar 45 connecting the side bars 42, apertured window portions 43 defined by being surrounded by side bars 42 and cross bars 45, and tabs 49 extending longitudinally to a predetermined distance into the window portions 43.

Figure 17:
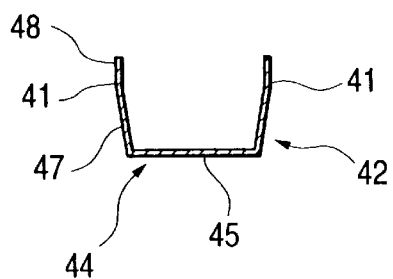
FIG. 17 is a cross sectional view of the ribbon spring of FIG. 16.

As it can be understood from FIG. 16, two rows of the side bars 42 are substantially in the same length (height) in a direction orthogonally crossing the transverse direction. FIG. 17 is a longitudinal cross sectional view of the ribbon spring 44, illustrating the details of the side bars 42. The side bars 42 bent from both ends of the cross bar 45, are standing from the cross bar 45 at an angle larger than 90 degrees, and the angle is changed at bend lines 41 to make tip portions 48. The tip portions 48 are substantially at right angle relative to the cross bar 45.

Figure 18:
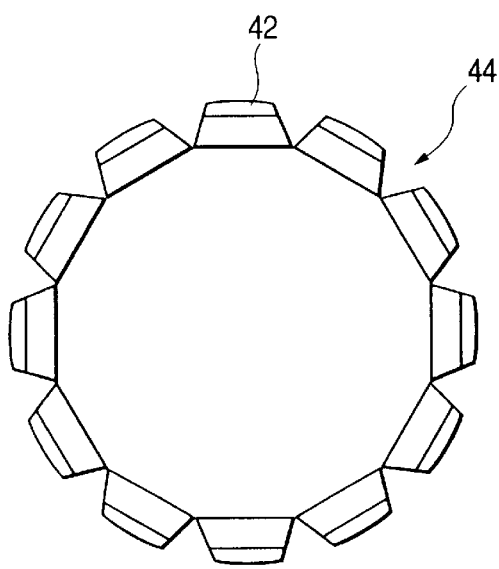
FIG. 18 is a front view of the ribbon spring of the third embodiment with side bars bent outward.
Figure 19:
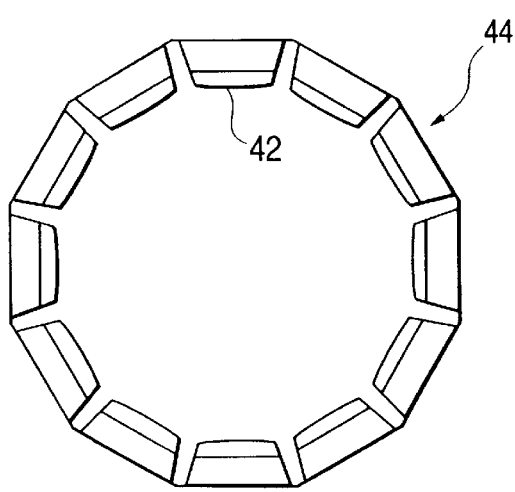
FIG. 19 is a front view of the ribbon spring of the third embodiment with side bars bent inward.

FIGS. 18 and 19 are front views of the ribbon spring 44 respectively in a state to be mounted on the one-way clutch. In FIG. 18, the ribbon spring 44 is illustrated in a state where the side bars 42 are faced outward, similarly to the first embodiment, while in FIG. 19, the ribbon spring 44 is illustrated in a state where the side bars 42 are bent in the reverse way to be faced inward. Accordingly, the inward faced ribbon spring 44 of FIG. 19 has side bars 42 opposing to the outer peripheral surface of the inner race.

FIGS. 20 and 21 are views showing a one-way clutch 40 using the ribbon spring 44 of the third embodiment. FIG. 20 is an axial cross sectional view illustrating a bearing integrated one-way clutch 40, with the ribbon spring 44 mounted thereon; composed of a bearing portion and the one-way clutch portion integrated into a body.

In FIG. 20, the ribbon spring 44 in the form illustrated in FIG. 19 is mounted. The basic structure thereof is the same as the first embodiment illustrated in FIG. 3. In the third embodiment, the bearing integrated one-way clutch 40 comprises an outer race 51 composing a bearing portion 56 and a one-way clutch portion 57 having larger inside diameter than the bearing portion 56, and an inner race 52. Between the inner peripheral surface of the bearing portion 56 and the outer peripheral surface of the inner race 52, balls 54 are sandwiched to form a bearing. Between the inner peripheral surface of the one-way clutch portion 57 and the outer peripheral surface of the inner race 52, sprags 53 and the ribbon spring 44 retaining the sprags are arranged. On the inner peripheral surface of the one-way clutch portion 57 of the outer race 51, tip portions 48 of the ribbon spring 44 is disposed to slide. The tip portions 48 of one of the two rows of the tip portions 48 are respectively abutted on and retained by the end surface 58 of a step portion provided on the boundary between the bearing portion 56 of the outer race 51 and the one-way clutch portion 57, and the tip portions 48 of the other row are respectively abutted on and retained by the retainer 50 secured to and retained by the outer race. Accordingly, the ribbon spring 44 is axially retained in a predetermined position.

In FIG. 21, the upper half thereof is a cross sectional view of FIG. 20 along the upper portion of a line 21—21 seen from the direction of an arrow V, and the lower half along the lower portion of said line is a cross sectional view thereof seen from the direction of arrow V. The upper half illustrates a state where the ribbon spring 44 is abutting on the inner peripheral surface of the inner race 51 while retaining the sprag 53 on the constricted portion of the sprag 53, and the lower half illustrates the structure of the bearing portion where the ball 54 roll.

Conversely to the above-described structure, a step may be made on the side of the inner race, and rolling-up of the ribbon spring may be made so as to have the side bars inside.

In FIGS. 15 to 21, all the side bars are bent to have the drag torque generated relative to the outer race, but the positions for bending may be arbitrarily set. The bending may also be worked either on the side of the retainer or the side of the step or on both of the sides.

In the third embodiment, as the ribbon spring 44 also retains the sprag 53, the cage conventionally required becomes unnecessary.

[Fourth Embodiment]

Figure 22:
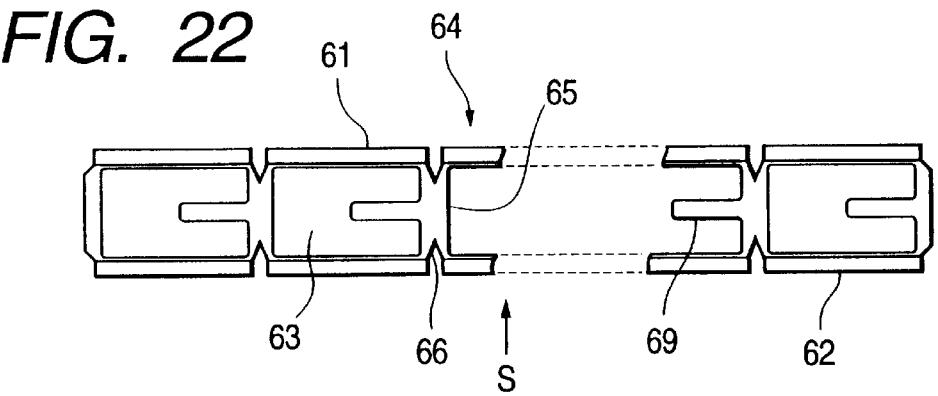
FIG. 22 is a top view of the ribbon spring of a fourth embodiment.

FIGS. 22 to 27 illustrate a fourth embodiment of the present invention. FIG. 22 illustrates a ribbon spring 64 of the present embodiment in a state where side bars 61 and 62 are standing. The basic structure thereof is the same as the ribbon spring 4 illustrated in FIGS. 1 and 2.

Figure 23:
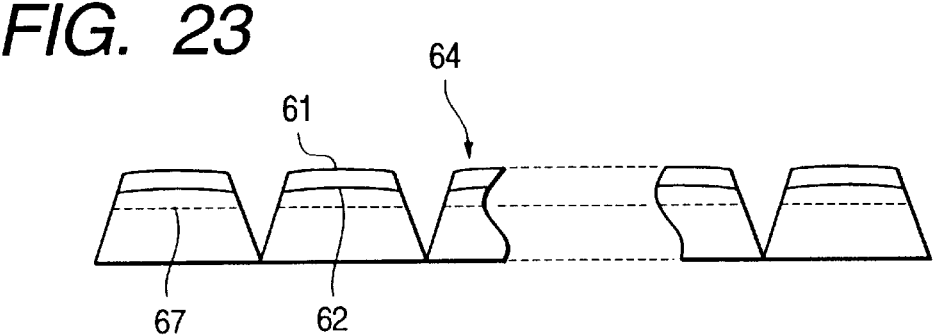
FIG. 23 is a side view of the ribbon spring of FIG. 22 seen from the direction of an arrow S.

FIG. 22 is a top view of a ribbon spring 64, and FIG. 23 is a side view of the ribbon sprig 64 of FIG. 22 seen from the direction of an arrow S. The ribbon spring 64 comprises a plurality of side bars 61 and 62, respectively bent substantially in right angle to be standing and arranged substantially in parallel in two rows, cross bars 65 connecting the side bars 61 and 62, apertured window portions 63 defined by being surrounded by side bars 61 and 62 and the cross bars 65, and tabs 69 extending longitudinally to a predetermined distance into the window portions 63.

Figure 24:
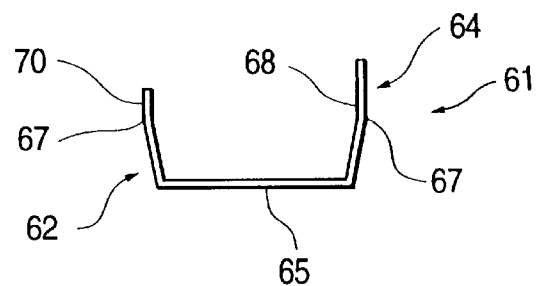
FIG. 24 is a cross sectional view of the ribbon spring of FIG. 23.

As it can be understood from FIGS. 23 and 24, two rows of the side bars 61 and 62 have different length (height) in a direction orthogonally crossing the longitudinal direction, and the side bars 61 are longer. FIG. 24 is a transverse cross sectional view of the ribbon spring 64, and illustrates the details of the side bars 61 and 62. The side bars 61 and 62, bent from both ends of the cross bar 65, are standing from the cross bar 65 at an angle larger than 90 degrees, and the angle is changed at bend lines 67 to respectively make tip portions 68 and 70. The tip portions 68 and 70 are substantially at right angle relative to the cross bar 65, namely a bottom surface of the ribbon spring 64.

Figure 25:
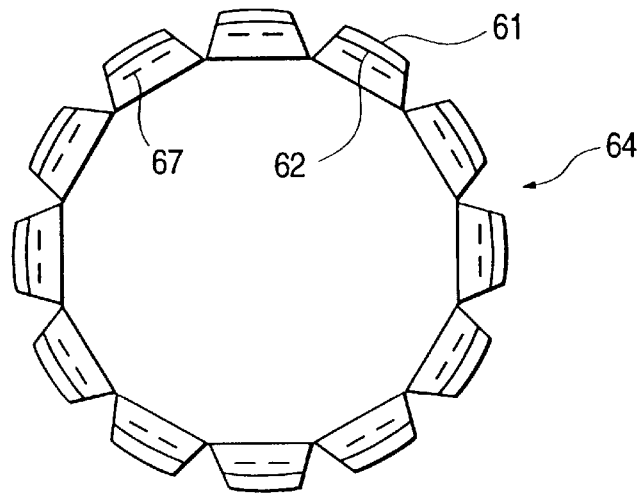
FIG. 25 is a front view of the ribbon spring of the fourth embodiment with side bars bent outward.

FIG. 25 is a front view of the ribbon spring 64 in a state to be mounted on the one-way clutch. In FIG. 25, similarly to the first embodiment, the ribbon spring 64 is illustrated in a state where the side bars 61 and 62 are faced radially outward. It goes without saying that, similarly to the other embodiments, conversely to FIG. 25, the side bars 61 and 62 of the ribbon spring 64 can be bent to face inward. In such case, the side bars 61 and 62 of the ribbon sprig 64 oppose the outer peripheral surface of the inner race 72 (refer FIG. 26).

FIGS. 26 and 27 are views showing a one-way clutch 60 using the ribbon spring 64 of the fourth embodiment.

As illustrated in FIG. 26, the tip portion of the longer side bar 61 of the ribbon spring 64 is inserted into an annular groove 77 provided on the inner peripheral surface of the outer race 71, and retained thereby. The tip portion of the shorter side bar 62 is abutted on the inner peripheral surface of the outer race 71. On the outer race 71, at an axial end, a step portion 76 having a inner peripheral surface of a larger diameter is formed, and an annular end bearing 78 is abutted on an end surface 74 of the step portion 76. The shorter side bar 62 is abutted on and retained by the end bearing 78.

The end bearing 78 is further abutted on an annular snap ring 75 from the axial outside to be prevented from axially falling off. The end bearing 78 serves to concentrically hold the outer race 71 and the inner race 72. Further, the snap ring 75 is inserted into a groove provided on the inner peripheral surface of the step portion 76 of the outer race 71.

In the present embodiment, the side bars 62 of the ribbon spring 64 slide on the end surface 74 of the outer race 71 via the end bearing 78 to provide drag torque to the outer race 71.

FIG. 27 is a front view of FIG. 26 seen from the direction of an arrow W. The view shows that the sprags 73 are retained by the ribbon springs 64 at the constricted portion thereof.

Further, the ribbon spring 64 is bent to insert the side bars 61 thereof into a groove on the inner peripheral surface of the outer race for preventing it from axially falling off.

Furthermore, the end bearing 78 is mounted on the step portion of the outer race, and the end bearing 78 is secured by fastening with a snap ring, and further, by axial elasticity of the ribbon spring 64, drag torque is generated.

The drag torque may be generated not only by use of the axial elasticity but also by use of the circumferential deflection. Further, generation of the drag torque may be embodied only axially as described above, or in both axially and circumferentially.

The above described arrangement may be reversed for an embodiment in which a groove and a step are provided on the side of the inner race so that the rolling-up of the ribbon spring may be made so as to have the flange inside.

In FIGS. 22 to 27, the side bars at all positions are bent for generating drag torque, but the positions for bending may be arbitrarily set. Further, the side bars either on the side of the retainer or on the side of the step or both of the sides may be embodied for generation of the drag torque.

In the fourth embodiment, as the ribbon springs 64 also retain the sprags 73, the conventionally required cage becomes unnecessary.

[Fifth Embodiment]

Figure 29:
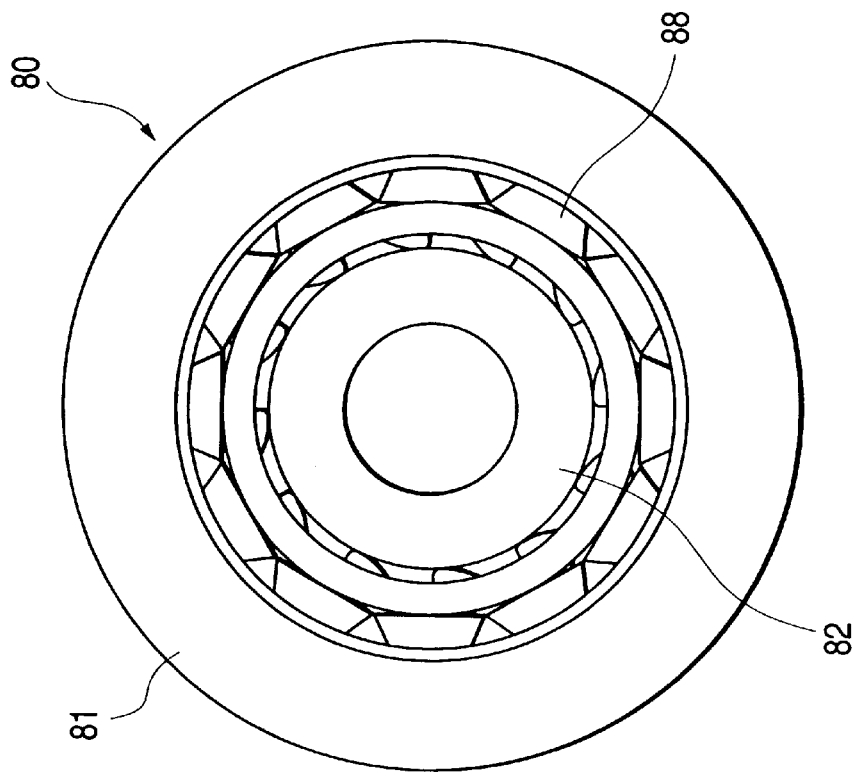
FIG. 29 is a front view of the one-way clutch of FIG. 28 seen from the direction of an arrow U.
Figure 28:
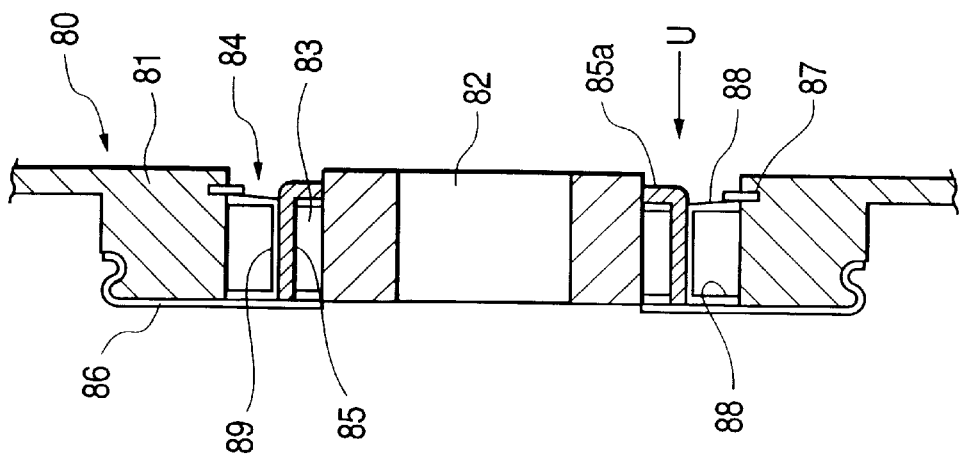
FIG. 28 is an axial cross sectional view of the one-way clutch of a fifth embodiment.
Figure 30:
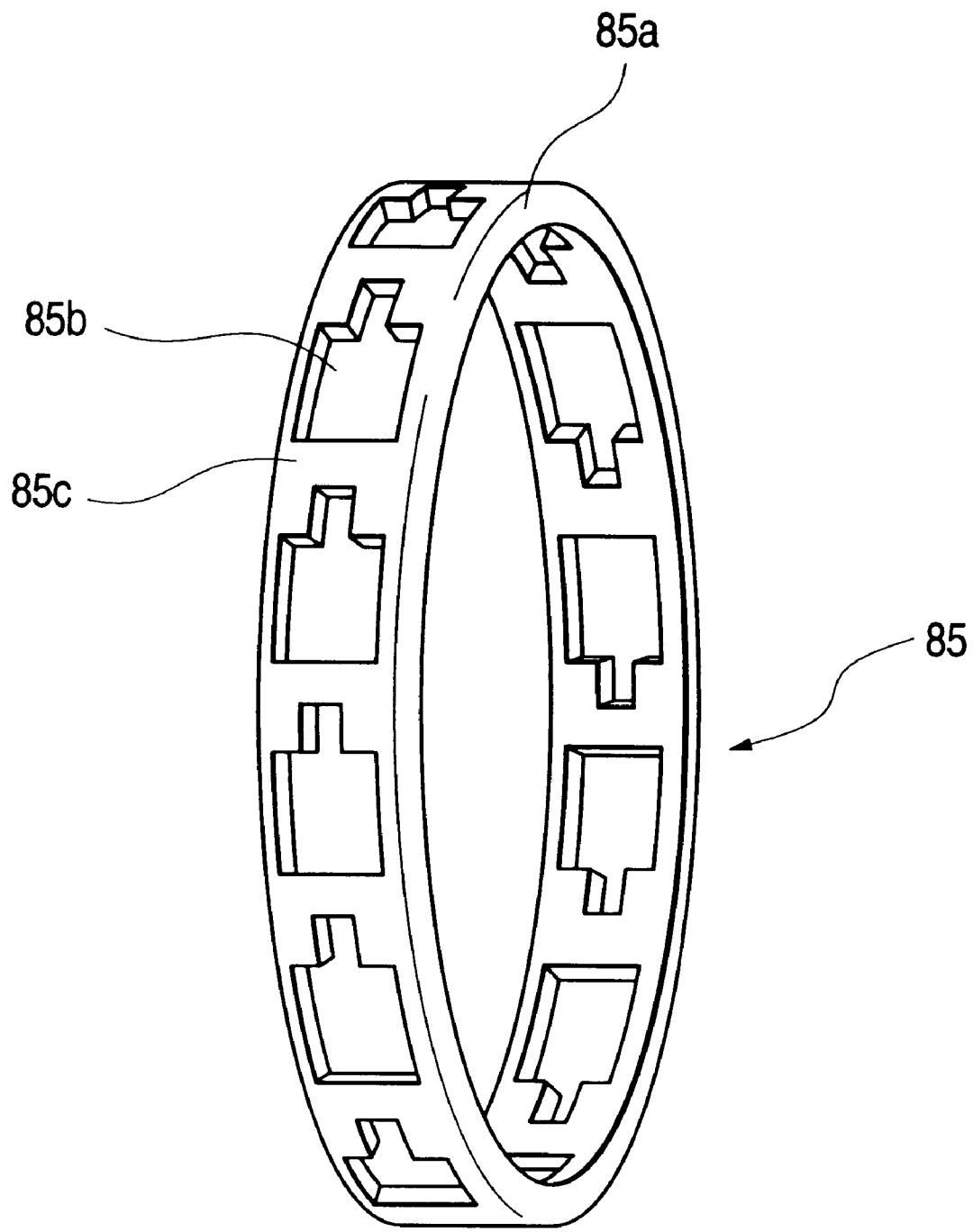
FIG. 30 is a perspective view of a cage used in the fifth embodiment.
Figure 33:
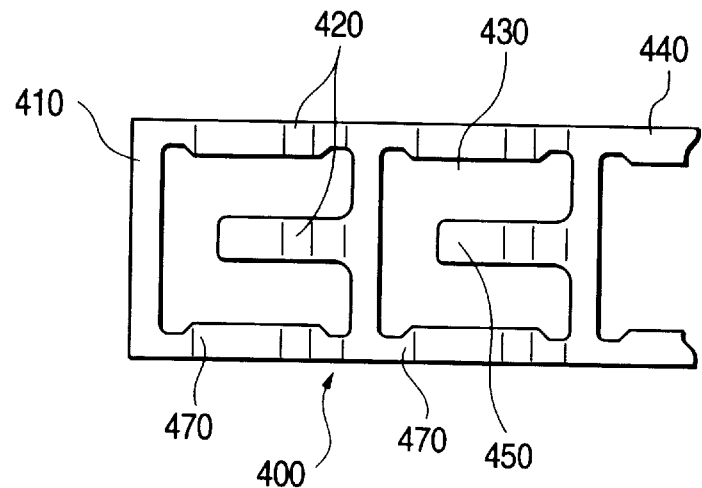
FIG. 33 is a front view (tip portion) of a conventional ribbon spring.
Figure 34:
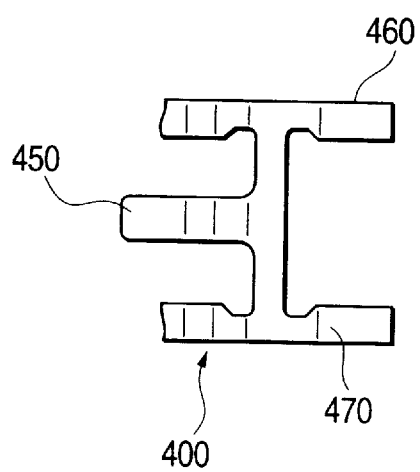
FIG. 34 is a front view (the opposite tip portion of FIG. 33) of the conventional ribbon spring.
Figure 35:
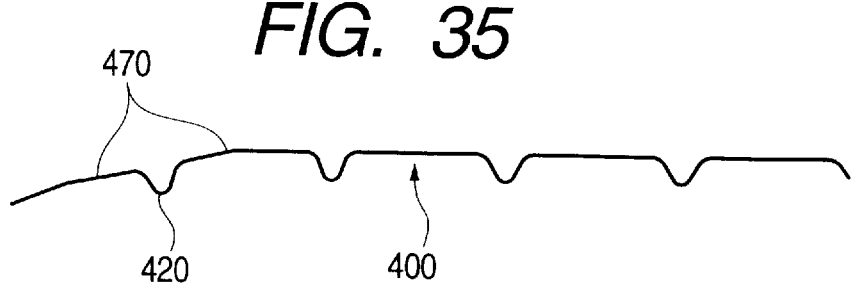
FIG. 35 is a side view of the ribbon spring of FIG. 33.

FIGS. 28 to 30 are views showing a one-way clutch 80 using a ribbon spring 84 of a fifth embodiment. The ribbon spring 84 of the present embodiment is a structure substantially similar to the ribbon spring 4 of the first embodiment, and the side bars 88 of both sides are the same in the length.

As illustrated in FIG. 28, tip portions of the side bars 88 in two rows of the ribbon spring 84 are disposed to slide on the inner peripheral surface of an outer race 81. In the case of the present embodiment, in addition to the ribbon spring 84, a cage 85 is arranged.

As illustrated in FIG. 30, an annular cage 85 has an annular cylinder portion 85c, an annular flange portion 85a extending from an axial end portion of the cylinder portion 85c toward radially inner direction, and a plurality of window portions 85b apertured in predetermined intervals along the circumferential direction of the cylinder portion 85c. Sprags 83 are swingably retained on the window portions 85b.

As clearly understood from FIG. 28, the cylinder portion 85c of the cage 85 is arranged neighboring to a cross bar 89 of the ribbon spring 84. The sprags 83 are swingably retained by the window portions 85b of the cage 85 and a window portion (not shown) of the ribbon spring 84.

The side bars 88 of the ribbon spring 84 are retained at an axial end by a snap ring 87, and the side bars 88 of the other end are disposed to slide on an annular retainer 86 secured to the outer race 81. The tip of the annular flange 85a of the cage 85 is disposed to oppose to and slide on the outer peripheral raceway surface of the inner race 82.

FIG. 29 is a front view of the one-way clutch 80 of FIG. 28 seen from the direction of an arrow U, and illustrates relationship between the cage 85, the ribbon spring 84, and the sprags 83.

In the case of the present embodiment, drag torque is generated relative to the outer race 81 via the side bars 88 of the ribbon spring 84 and the snap ring 87 secured to the outer race 81. Further, as the cage is used, roll-over and hopping can easily be prevented. Furthermore, a limit can be set for the gradient of a sprag. Still more, strength of a one-way clutch as a whole can be improved.

In the meantime, in each embodiment described above, cross bars are circumferentially bent across whole circumference, or at a predetermined position. Further, both ends of the ribbon spring in the longitudinal direction (circumferential direction) are preferably secured by welding, brazing, or the like.

According to the present invention as described above, the following advantages can be obtained.

A compact sprag type one-way clutch can be provided without changing torque capacity.

As the number of parts can be reduced, materials and manufacturing processes can be partially curtailed, enabling reduction in production cost.

Axial mounting width of a spring member may be reduced. Further, as sprags are retained by a spring member per se, a cage becomes unnecessary.

Drag torque is generated from a spring member by a flange member.

As a flange member is provided, rigidity of a ribbon spring improves.

As a notch is provided, a wrinkle (convex bending) can be eliminated.

Workability can be improved.

As a spring member is disposed to have a flange function, positioning is made possible.

Axial backlash of sprags can be suppressed.

Further, if a cage is used, roll-over and hopping can be prevented.

What is claimed is:

1. A sprag one-way clutch, comprising:

an outer race having an inner peripheral raceway surface and an inner race having an outer peripheral raceway surface arranged inside the outer race, said outer and inner races being radially spaced from each other, relatively rotatable, and concentrically arranged with each other;

a plurality of sprags, arranged between said outer race and said inner race, for transmitting torque between said outer peripheral raceway surface and said inner peripheral raceway surface; and a substantially annular spring member retaining said sprags, and urging said sprags in a torque transmitting direction;

wherein said spring member has window portions retaining said sprags, and at least one axial end portion of said spring member has flange portions bent from cross-bar portions of said spring member disposed circumferentially between said window portions, said flange portions contacting one of said outer race and said inner race.

2. A sprag one-way clutch according to claim 1, wherein said flange portions perform centering of said spring member relative to outer race and said inner race.

3. A sprag one-way clutch according to claim 1, wherein said flange portions are bent to mount said spring member on said outer race.

4. A sprag one-way clutch according to claim 1, wherein notches are provided between successive ones of said flange portions and extend into said cross-bar portions.

5. A sprag one-way clutch according to claim 1, further comprising a cage retaining said sprags.

6. A sprag one-way clutch according to claim 1, wherein said cross-bar portions are bent circumferentially of the clutch.

7. A sprag one-way clutch according to claim 5, wherein said flange portions are bent, to give elasticity thereto, axially inward or outward relative to said cage, so that drag torque is set for the inner or the outer race.

8. A sprag one-way clutch according to claim 1, wherein opposite axial end portions of said spring member are secured to one of said outer race and said inner race.

9. A sprag one-way clutch according to claim 1, wherein said flange portions of said one axial end portion of said spring member are fitted in a groove in one of said outer and inner raceway surfaces.

10. A sprag one-way clutch according to claim 1, wherein said flange portions of said one axial end portion of said spring member are retained in a stepped portion of one of said outer and inner races.

11. A sprag one-way clutch according to claim 1, wherein said flange portions of said one axial end portion of said spring member are retained in a stepped portion of one of said outer and inner races by a retaining member attached to said one race.

12. A sprag one-way clutch, comprising:

an outer race having an inner peripheral raceway surface and an inner race having an outer peripheral raceway surface arranged inside the outer race, said outer and inner races being radially spaced from each other, relatively rotatable, and concentrically arranged with each other;

a plurality of sprags, arranged between said outer race and said inner race, for transmitting torque between said outer peripheral raceway surface and said inner peripheral raceway surface; and a substantially annular spring member retaining said sprags, and urging said sprags in a torque transmitting direction;

wherein said spring member has a plurality of window portions disposed at circumferential intervals, said sprags are retained in said window portions, and at least one axial end portion of said spring member has flange portions bent on a circumferential bending line disposed between circumferentially extending edges of said window portions, said flange portions contacting one of said outer race and said inner race.

13. A sprag one-way clutch according to claim 12, wherein said flange portions perform centering of said spring member relative to outer race and said inner race.

14. A sprag one-way clutch according to claim 12, wherein said flange portions are bent to mount said spring member on said outer race.

15. A sprag one-way clutch according to claim 12, wherein notches are provided between successive ones of said flange portions and extend into cross-bar portions of said spring member between said window portions.

16. A sprag one-way clutch according to claim 12, further comprising a cage retaining said sprags.

17. A sprag one-way clutch according to claim 12, wherein said spring member has cross-bar portions between said window portions, said cross-bar portions being bent in a circumferential direction of the clutch.

18. A sprag one-way clutch according to claim 16, wherein said flange portions are bent, to give elasticity thereto, axially inward or outward relative to said cage, so that drag torque is set for the inner race or the outer race.

19. A sprag one-way clutch according to claim 12, wherein opposite axial end portions of said spring member are secured to one of said outer race and said inner race.

20. A sprag one-way clutch according to claim 12, wherein said flange portions of said one axial end portion of said spring member are fitted in a groove in one of said outer and inner raceway surfaces.

21. A sprag one-way clutch according to claim 12, wherein said flange portions of said one axial end portion of said spring member are retained in a stepped portion of one of said outer and inner races.

22. A sprag one-way clutch according to claim 12, wherein said flange portions of said one axial end portion of said spring member are retained in a stepped portion of one of said outer and inner races by a retaining member attached to said one race.

* * * * *